Figure 6:
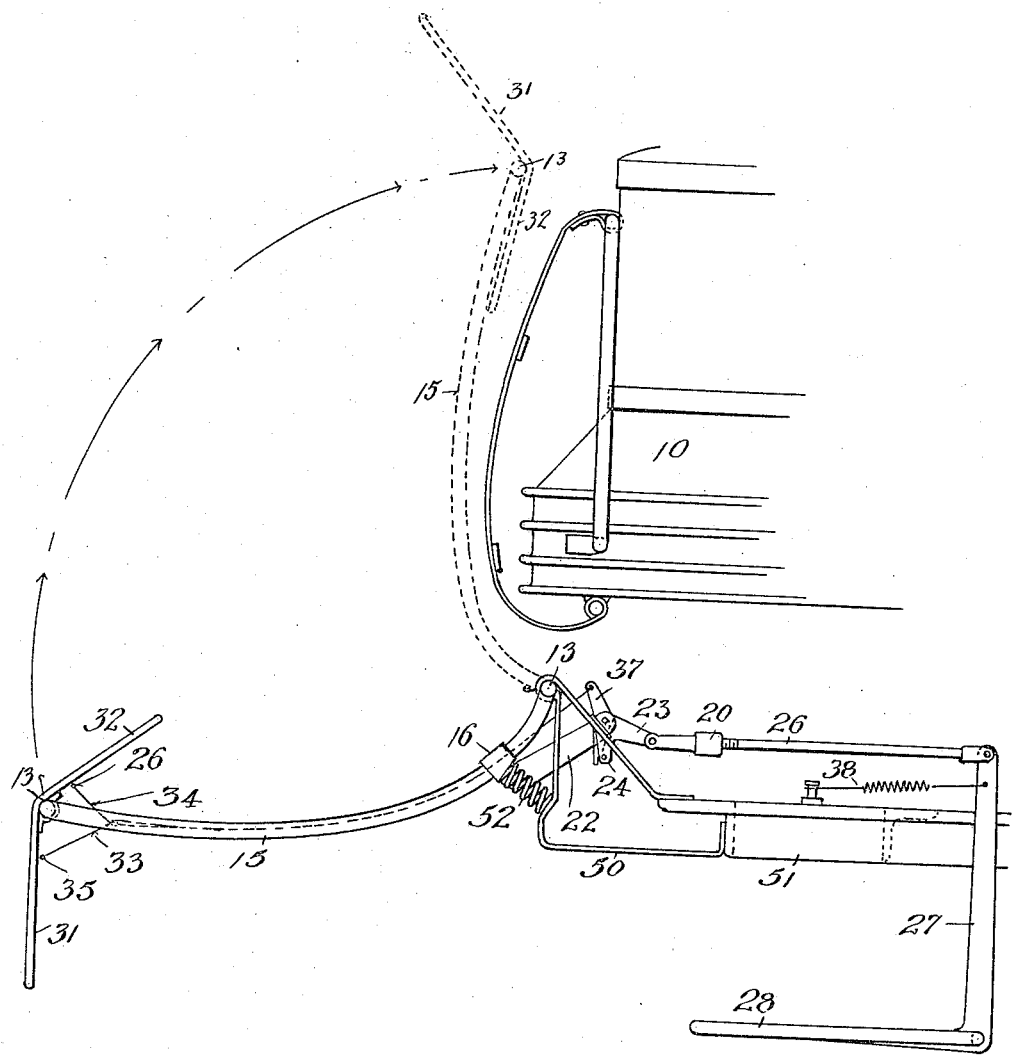

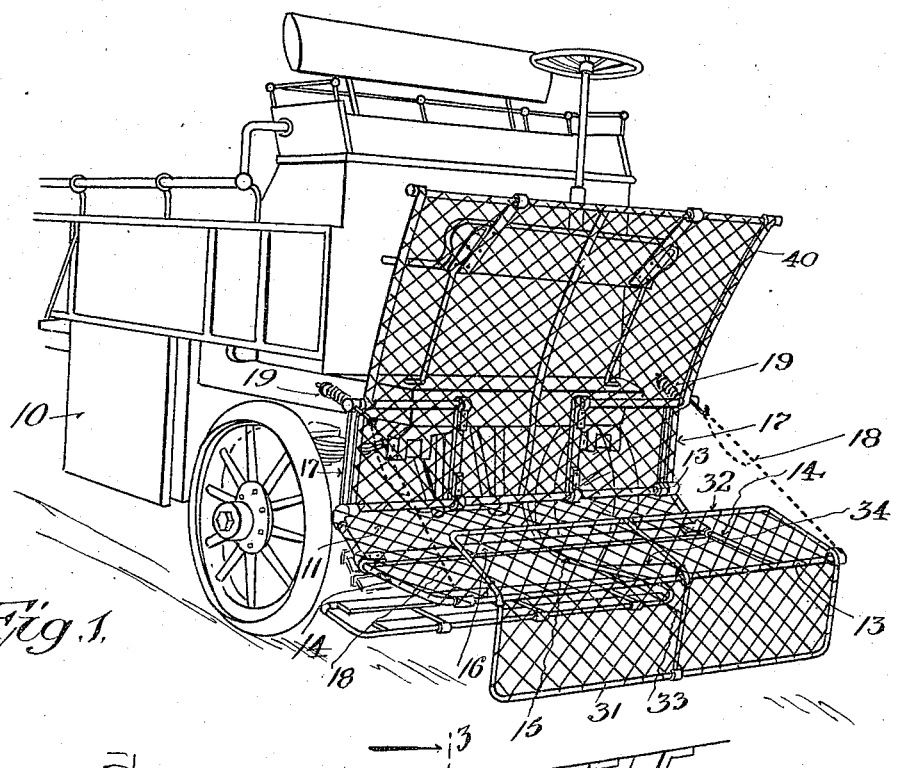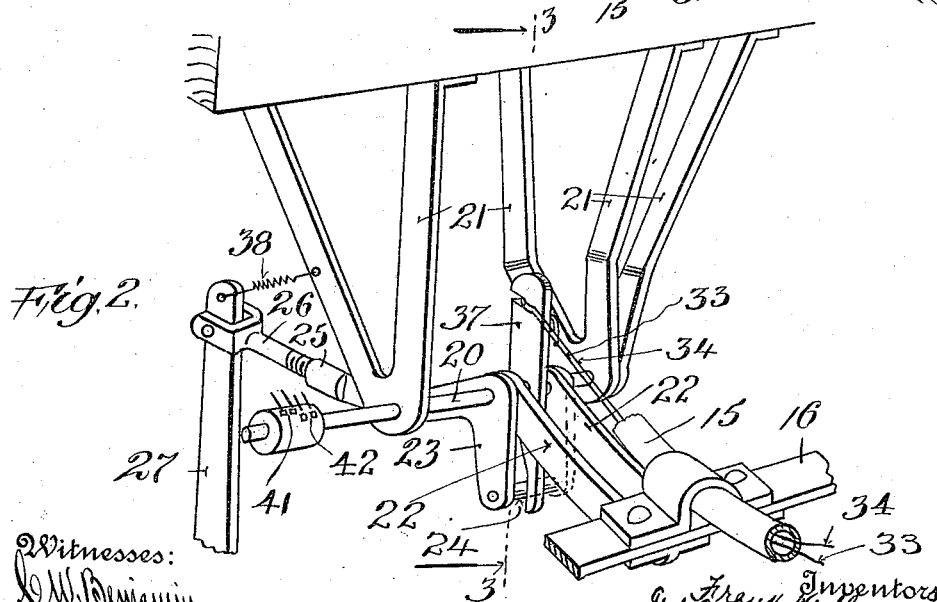

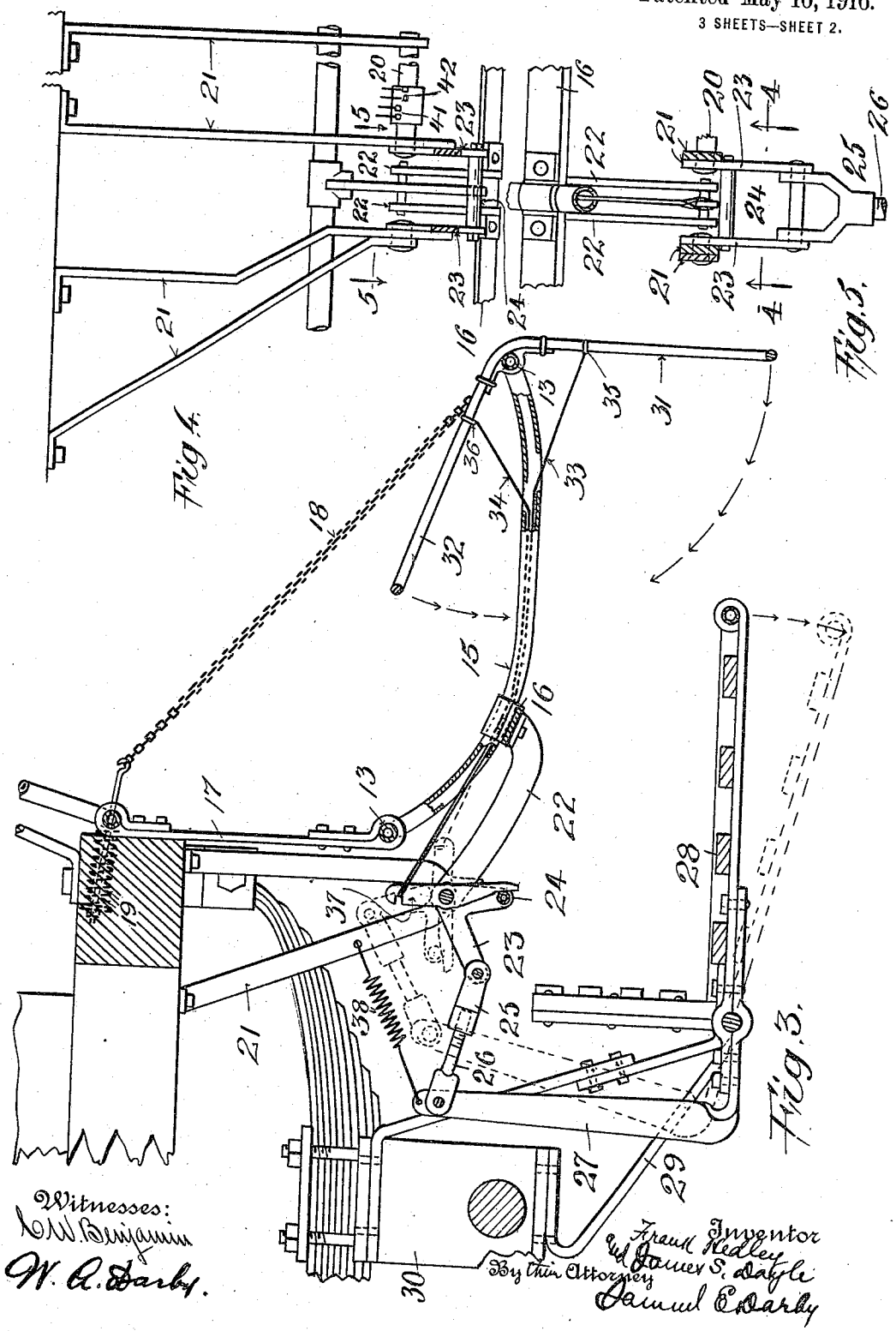

UNITED STATES PATENT OFFICE.

FRANK HEDLEY, OF YONKERS, AND JAMES S. DOYLE, OF MOUNT VERNON, NEW YORK.

COMBINED FRONT FENDER AND WHEEL-GUARD.

1,183,559.  Specification of Letters Patent.  Patented May 16, 1916.

Application filed September 29, 1913. Serial No. 792,416.

*To all whom it may concern:*

Be it known that we, FRANK HEDLEY and JAMES S. DOYLE, both citizens of the United States, and residing, respectively, at Yonkers and Mount Vernon, in the county of Westchester, State of New York, have made a certain new and useful Invention in a Combined Front Fender and Wheel-Guard, of which the following is a specification.

This invention relates to a combined front fender and wheel guard for use on street cars, automobiles, autotrucks or other vehicles.

The object of the invention is to provide a construction of combined front fender and wheel guard which is simple and efficient, and wherein provision is made for preventing fatal or major accidents in case of collisions of vehicles with pedestrians.

A further object is to provide means for preventing a pedestrian, in case of collision, from being injured by being thrown violently against the end of the colliding vehicle, or to the ground, and wherein efficient means are combined therewith for picking up a prostrate body on the ground.

A further object is to provide an apparatus of the nature referred to wherein provision is made for preventing the feet or limbs of a pedestrian, when thrown by collision of a vehicle, from being dragged beneath the moving vehicle.

A further object is to mount the combined front fender and wheel guard apparatus on the vehicle truck frame thereby enabling the fender and guard to be carried and to operate at a minimum height above the ground.

Other objects of the invention will appear more fully hereinafter.

The invention consists substantially in the construction, combination, location, and relative arrangement of parts, all as will be more fully hereinafter set forth, as shown in the accompanying drawings and finally pointed out in the appended claims.

Referring to the accompanying drawings:—Figure 1 is a view, in perspective, of the front end of a vehicle showing the application thereto of a combined front fender and wheel guard construction embodying the principles of our invention. Fig. 2 is a broken detail view in perspective, showing the tripping mechanism. Fig. 3 is a broken view in central vertical section, taken longitudinally of the vehicle, as indicated by the section line 3, 3, Fig. 2, looking in the direction of the arrows. Fig. 4 is a broken detail view partly in front elevation and partly in vertical section on the line 4, 4, Fig. 5, looking in the direction of the arrows. Fig. 5 is a broken detail view in plan, partly in horizontal section on the line 5, 5, Fig. 4, looking in the direction of the arrows. Fig. 6 is a broken view in side elevation showing the application of the apparatus to the truck frame of a street car.

The same part is designated by the same reference sign wherever it occurs throughout the several views.

In the ordinary forms of the car fenders as now most commonly used in practice on vehicles, such, for instance, as street cars, a fender frame is pivotally suspended from and beneath the front end of the vehicle body and is restrained in retracted position by a tripping latch the latter being operated by a swinging gate also placed beneath the front end of the vehicle in advance of the guard frame. The serious objection to this construction in practice is that in case of collision with a pedestrian, the pedestrian must be knocked prostrate to the ground by the impact of the collision before the gate can become effective to trip the guard in order that it may accomplish its proper function. Moreover, in case of such collision the grave danger is incurred of inflicting a major if not fatal injury upon the pedestrian collided with by reason of being thrown violently against the end of the vehicle or the ground, thereby causing skull fracture or other injury. Experience in the operation of vehicles, particularly in streets that are frequently congested with foot passenger traffic, has shown that in a large number of cases of collision with pedestrians the victim if standing upright or nearly so, is first struck usually at a point about, or possibly below the height of the knees with the result that the lower limbs or lower part of the body of the victim is usually thrown forwardly away from the front end of the vehicle while the upper part of the body falls or is thrown rearwardly toward the front end of the vehicle, thereby incurring the danger of the head of the victim striking against the front end of the vehicle. Again, in common forms of appliances as generally employed in practice, the lower edge of the fender is usually maintained at such a height from the ground as to permit the limbs or body of a victim to pass underneath the same thereby resulting in a failure of the apparatus to accomplish the purposes intended by its use. Again, it has been the practically universal custom to suspend the fender and its associated parts from the body of the vehicle, in which event, in the case of a street car, for instance, in turning curves, the fender is carried sidewise with the body and consequently is swung out of position to efficiently protect pedestrians in case of collision on curves from danger of being knocked down and run over by the wheels of the vehicle.

It is among the special purposes of our present invention to avoid the objections above noted, among others, and to provide means whereby the victim of a collision is protected from danger of receiving a major or a fatal injury.

In the accompanying drawings we have shown illustrative forms of embodiment of our invention, but it is to be understood that in the broad scope of our invention, as defined in the claims, we are not to be restricted or limited to the exact details of construction and arrangement shown.

In the drawings 10, designates any desired form of vehicle such as a motor truck, automobile, street car or the like. In Figs. 1 to 5, the fender 11 is shown in the form of a netting carried by a frame composed of side portions 13, and end portions 14, the side portions being connected together intermediate their ends by a cross member 15, which is preferably of tubular form. The end portions of the fender frame if desired may also be connected together by a bar 16, and said frame is supported at its rear edge by supporting brackets 17. The front side member 13, has connected to the ends thereof suitable extensible supporting devices 18 which, in this instance, are shown in the form of chains, which are connected at their rear ends to compression springs 19, which serve the function of permitting the front edge of the fender to be depressed in case a weight is imposed thereon, to carry said edge downwardly toward the surface of the ground.

Pivotally mounted on suitable brackets 21, are bell crank levers 23, corresponding arms of which are connected together by a cross piece 24. The other arms of the bell crank levers 23, are pivotally connected through an adjustable connection 25, and rod 26, or otherwise, with an arm 27, which carries the pivotally mounted wheel guard 28, the latter being pivotally suspended in brackets 29, from the truck 30 of the vehicle.

Pivotally mounted upon the front fender frame side bar 13 is an angularly shaped auxiliary frame or gate having one portion 31, thereof depending downwardly from the fender frame and the other portion 32, thereof extending rearwardly over the front portion of the fender, said auxiliary gate being pivoted at the angle thereof to said side bar 13. The gate when mounted and arranged as described constitutes a tripping gate when tilted for the guard 28. In accordance with our invention we provide means whereby said gate may perform its tripping function when tipped or tilted in either direction. To this end we connect wires or cords 33, 34, to said auxiliary frame respectively on opposite sides of the pivotal axis thereof, as indicated at 35, 36, whereby when said gate is tilted in one direction a pull is exerted upon one of said cords or wires, and when tilted in the opposite direction a pull is exerted upon the other cord or wire, and of course when a pull is exerted on either cord or wire the other is made slack. The connections 33, 34, are both connected to the upper end of a trip lever 37, which is pivotally mounted on or carried by arms 22, connected to and extending rearwardly from the cross bar 16 of the fender. The lower end of the trip lever 37, bears against the cross piece 24, which connects two of the corresponding arms of the bell crank levers 23, and under normal conditions, with the gate held in medial position, the engagement of the lower end of the trip lever against cross piece 24, serves to hold or retain the wheel guard 28, in raised or retracted position, as shown in full lines in Fig. 3 and in Fig. 6 and against the action of a spring 38, connected to the arm 27 of said guard, and the tension of which is normally exerted to rock the guard downwardly as indicated in dotted lines in Fig. 3. With this arrangement it will be seen that when the auxiliary gate carried at the front end of the fender is rocked in either direction the trip lever 37 is rocked in a direction to cause the lower end thereof to rock the bell crank levers 23, so as to cause the rod 26, and connection 25, to pass a dead center line between the points of connection of said rod with arm 27, and the axis of the bell crank levers. When this line is passed the spring 38 becomes effective to rock the guard 28 downwardly into position to accomplish its function of a wheel guard and a pick up.

The tripping gate is rocked or tilted by pressure exerted on either the upper or lower vertical depending portion thereof. For instance, in case of collision of the vehicle with a pedestrian, the victim will be struck by the front side bar 13 of the fender and under normal conditions the victim will fall toward the vehicle and consequently the weight of the falling body will be imposed on the upper part 32 of the auxiliary gate thereby depressing said upper part downwardly. This action results in a pull being exerted on the connection 33 which is connected to the lower vertically hanging portion 31 of the gate, and which lower vertically hanging portion rocks forwardly under the conditions named. The pull exerted upon the connection 33, results in rocking the trip lever 37, and the tripping of the guard 28. The forwardly swinging lower vertically hanging portion 31 of the gate serves another important function namely, it forces the feet of the victim forwardly in front of it, thereby not only tending to prevent the feet of the victim from passing underneath the front end of the fender but also tending to insure the fall of the victim rearwardly onto the fender instead of being thrown forwardly onto the ground thereby guarding against serious injury. In the event, however, of the victim being thrown forwardly to the ground, the portion 31 of the gate by coming in contact with the prostrate body will swing or tilt rearwardly thereby exerting a pull on the connection 34 and causing the lever 37 to trip and release the guard 28, and the latter to drop down. Thus, in any case, the wheel guard will be tripped while in the event the victim falls rearwardly onto the fender he is caught and held without serious injury. If desired, and in order to efficiently guard against the danger of the head of a person thrown onto the fender coming violently in contact with the end of the car body, we may provide a supplemental fender 40, and arrange the same above the rear end of the main fender to cover the vertical front end surface of the car body, as shown.

Where a person is thrown onto the fender 11, the weight of the body imposed thereon will depress the forward edge of the fender against the action of the springs 19, thereby permitting said edge to approach a minimum height above the surface of the ground and hence reducing the danger of the feet or limbs of the person thrown onto the fender from being dragged under the fender.

In addition to the safety features and operations above described it may be desirable, some times, to automatically shut off the power from the vehicle propelling motor, and also in some cases, to apply the brakes. These results may be accomplished in many different ways. We have shown one arrangement for illustrative purposes, wherein the operation of the gate at the front end of the fender 11, also controls the connections to the vehicle propelling motor and to the brake mechanism. In the form shown, the axis of one of the bell cranks 23, is extended as at 20, to form a shaft which is journaled in brackets; and which rocks when said bell crank is rocked. Two pairs of insulated contacts 41, 42 are mounted on this extended shaft 20, to rock therewith, and coöperating with said contacts are brushes, one pair of brushes being employed in an electric circuit which controls the propelling motor, and the other pair of brushes being in a similar circuit to control the application of the brakes. Under normal running conditions the one or the other of said circuits may be closed or open as may be most convenient, whereas, when the shaft 20 is rotated the reverse action takes place. In one case the propelling motor control and the application of the brakes remain unaffected whereas in the other case the motor is arrested and the brakes are applied.

In order that the combined front fender and wheel guard mechanism may be supported in position to operate as close to the surface of the ground as possible, and also to be at all times in proper relation to the wheels of the vehicle to guard against the danger of running over pedestrians on curves, we propose, in one form of practical application of our invention to support the apparatus wholly on the vehicle truck frame and such an arrangement is shown in Fig. 6, wherein supporting brackets 50, are attached to the end frame 51, or other convenient part of the truck frame, and on this bracket the rear end or side bar 13 of the fender and also the bell crank arms 23, are journaled. In this case the suspending chains 18, for the forward end of the fender are dispensed with and the yielding tension against which the front end of the fender acts when it is depressed may be secured in any suitable or convenient manner, as for instance, by means of springs indicated at 52 interposed between the underside of the fender and the bracket 50.

With the construction and arrangement as above described it will be seen that there is no physical connection between the fender, or the trip lever 37, and the tripping crank arms 23, and their associated parts other than the mere bearing of the lever 37 against the cross connection 24, and consequently in case it may be desired for any purpose to raise the fender or fold it up against the front end of the car or vehicle, this can be done by simply elevating the front end of the fender to vertical position without in any way disturbing the crank arms 23, or tripping the wheel guard.

Having now set forth the objects and nature of our invention, and constructions embodying the principles thereof, what we claim as new and useful, and of our own invention, and desire to secure by Letters Patent is—

1. In a car fender apparatus, a front fender, a wheel guard both mounted on and carried by the truck of the car, means normally operating to hold the wheel guard in raised position, and means carried by the front end of said front fender for tripping said guard.

2. In a car fender apparatus, a front fender, a wheel guard, means normally operating to hold the wheel guard in raised position, and an auxiliary gate pivotally mounted at the front edge of the fender and operating, when tilted in either direction, to release said means.

3. The combination with a front fender and a normally raised wheel guard, of an auxiliary gate pivotally supported and connections operated by said gate when rocked in either direction for releasing said guard.

4. The combination with a front fender and a normally raised wheel guard, of a gate pivotally mounted upon the front end of the fender and having a portion depending vertically therefrom, and another portion extending over the front portion of the fender, and means operated by the tilting movement of said gate in either direction for releasing said guard.

5. The combination with a front fender and a normally raised wheel guard, of an angularly shaped gate pivotally supported at its angle to the front end of the fender, and means operated by the tilting movement of said gate in either direction for releasing said guard.

6. The combination with a front fender and a normally raised wheel guard, of a gate pivotally supported intermediate its ends to the front end of the fender, and means connected to said gate respectively on opposite sides of its axis, for releasing said guard whereby said guard is released whether the gate is tilted in one direction or the other.

7. The combination with a front fender, a normally raised wheel guard and a tripping lever for said guard, of a tripping gate carried by the fender at its front edge and connections from said gate to said tripping lever to release said guard when the gate is moved.

8. In a car fender apparatus, a front fender, means for yieldingly supporting the front end thereof, a swinging gate carried by the front end of the fender, a wheel guard, and means operated by the swinging movement of the gate in either direction for tripping said guard.

9. The combination with a front fender and a wheel guard, of a gate mounted on the fender to swing in two directions, and means operated by the swinging movement of said gate in either direction for tripping said guard.

10. The combination with a front fender and a wheel guard, of a tripping mechanism for said guard, a detent for restraining said tripping mechanism, a gate pivotally connected to the fender at the front end thereof, and connections from opposite sides of the pivotal axis of said gate to said detent for releasing said tripping mechanism in whichever direction said gate may be rocked.

In testimony whereof we have hereunto set our hands in the presence of the subscribing witnesses, on this 23rd day of September, A. D. 1913.

FRANK HEDLEY.
JAMES S. DOYLE.

Witnesses:
S. E. DARBY,
G. A. McGRATH.

Copies of this patent may be obtained for five cents each, by addressing the "Commissioner of Patents, Washington, D. C."